US009940320B2

(12) United States Patent　　(10) Patent No.: US 9,940,320 B2
Krishnamurthy et al.　　(45) Date of Patent: Apr. 10, 2018

(54) PLUGIN TOOL FOR COLLECTING USER GENERATED DOCUMENT SEGMENTATION FEEDBACK

(71) Applicant: International Business Machines Corporation, Armonk, NY (US)

(72) Inventors: Lakshminarayanan Krishnamurthy, Round Rock, TX (US); William G. O'Keeffe, Tewksbury, MA (US); David D. Taieb, Charlestown, MA (US); Cale R. Vardy, East York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/955,724

(22) Filed: Dec. 1, 2015

(65) Prior Publication Data
US 2017/0154031 A1　Jun. 1, 2017

(51) Int. Cl.
*G06F 17/27*　(2006.01)
*G06F 3/0481*　(2013.01)
*G06F 17/22*　(2006.01)

(52) U.S. Cl.
CPC ...... *G06F 17/2705* (2013.01); *G06F 3/04812* (2013.01); *G06F 17/2247* (2013.01)

(58) Field of Classification Search
CPC ..... G06F 17/212; G06F 17/211; G06F 17/217
See application file for complete search history.

(56) References Cited

U.S. PATENT DOCUMENTS

| 5,553,217 | A * | 9/1996 | Hart | G06K 15/02 715/209 |
|---|---|---|---|---|
| 7,308,138 | B2 | 12/2007 | Kawatani | |
| 8,509,534 | B2 | 8/2013 | Galic et al. | |
| 2002/0116418 | A1* | 8/2002 | Lachhwani | G06F 17/212 715/244 |
| 2004/0100509 | A1* | 5/2004 | Sommerer | G06F 17/30905 715/864 |
| 2004/0210833 | A1* | 10/2004 | Lerner | G06F 3/04883 715/201 |
| 2005/0187949 | A1* | 8/2005 | Rodenburg | G06F 17/30696 |
| 2010/0063799 | A1* | 3/2010 | Jamieson | G06F 17/30731 704/9 |
| 2011/0113323 | A1* | 5/2011 | Fillion | G06F 17/211 715/252 |

(Continued)

OTHER PUBLICATIONS

R. High, "The Era of Cognitive Systems: An Inside Look at IBM Watson and How it Works," IBM Redbooks, 2012.

(Continued)

*Primary Examiner* — Andrew T McIntosh
(74) *Attorney, Agent, or Firm* — Terrile Cannatti, Chambers & Holland, LLP; Michael Rocco Cannatti (57) ABSTRACT

A method, system and a computer program product are provided for collecting document segmentation data by activating a document segmentation collection browser plugin with a designated toolbar button to generate one or more initial document segments from a webpage document and to receive user feedback for modifying a first initial document segment through a document segment control tool to generate a modified set of one or more initial document segments which are stored as document and document preprocessing data for the webpage document.

20 Claims, 8 Drawing Sheets

(56) References Cited

U.S. PATENT DOCUMENTS

2013/0205202 A1 8/2013 Xiao et al.
2015/0205772 A1* 7/2015 Leventhal ........... G06F 17/2247
   715/234

OTHER PUBLICATIONS

Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

PLUGIN TOOL FOR COLLECTING USER GENERATED DOCUMENT SEGMENTATION FEEDBACK

BACKGROUND OF THE INVENTION

In the field of artificially intelligent computer systems capable of answering questions posed in natural language, cognitive question answering (QA) systems (such as the IBM Watson™ artificially intelligent computer system and other natural language question answering systems) process questions posed in natural language to determine answers and associated confidence scores based on knowledge acquired by the QA system. For such a system to return accurate, well formatted and concise answers, an important preprocessing step of the corpus ingestion process is for any documents being added to the corpus to be segmented. Typically, documentation segmentation is a difficult task that is performed with a software-based algorithmic language modeling approach, but compared to human processing, such algorithmic approaches have limited accuracy and are not well suited for processing documents with images, sophisticated layouts, or rich text formatting (e.g., HTML). Thus, while there is a variety of existing document segmentation tools, the limited ability to evaluate non-textual document information limits their accuracy. As a result, the existing solutions for efficiently preprocessing and segmenting documents are extremely difficult at a practical level.

SUMMARY

Broadly speaking, selected embodiments of the present disclosure provide a system, method, and apparatus for seamlessly collecting document segmentation details by providing an embeddable overlay into any web site that users can access to provide input as to how the document should be segmented. In selected embodiments, the document segmentation details collector may be implemented by using a plugin viewing tool (such as a browser plugin or document viewer plugin) embedded in the toolbar to incorporate user feedback and correction into a process of segmenting documents/pages that are added to a corpus in a QA system. Upon activation, the disclosed plugin viewing tool may be configured to algorithmically generate one or more initial composition segments for grouping text and/or image information from a document. In addition, the disclosed plugin viewing tool may also provide a set of segment manipulation tools for creating, resizing, or deleting the initial composition segment(s) to allow one or more users to provide feedback specifying how documents should be segmented and to modify or delete the initial composition segments to reflect the insight of the human observer. Instead of reorganizing page content, changing font size, or otherwise revising the document content, the plugin viewing tool provides a user feedback mechanism to markup a document into logical content blocks by generating, displaying, and modifying document segments presented to the user as an overlay on the document in a form that is ready to be ingested and analyzed by a QA system. Information assembled in a document submission window may be automatically sent to a corpus management tool where a domain expert or system knowledge expert can review and evaluate proposed document or document segment submissions for inclusion in one or more corpora to improve the overall accuracy of the system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing document segmentation data for improved accuracy and answer quality of cognitive QA systems.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
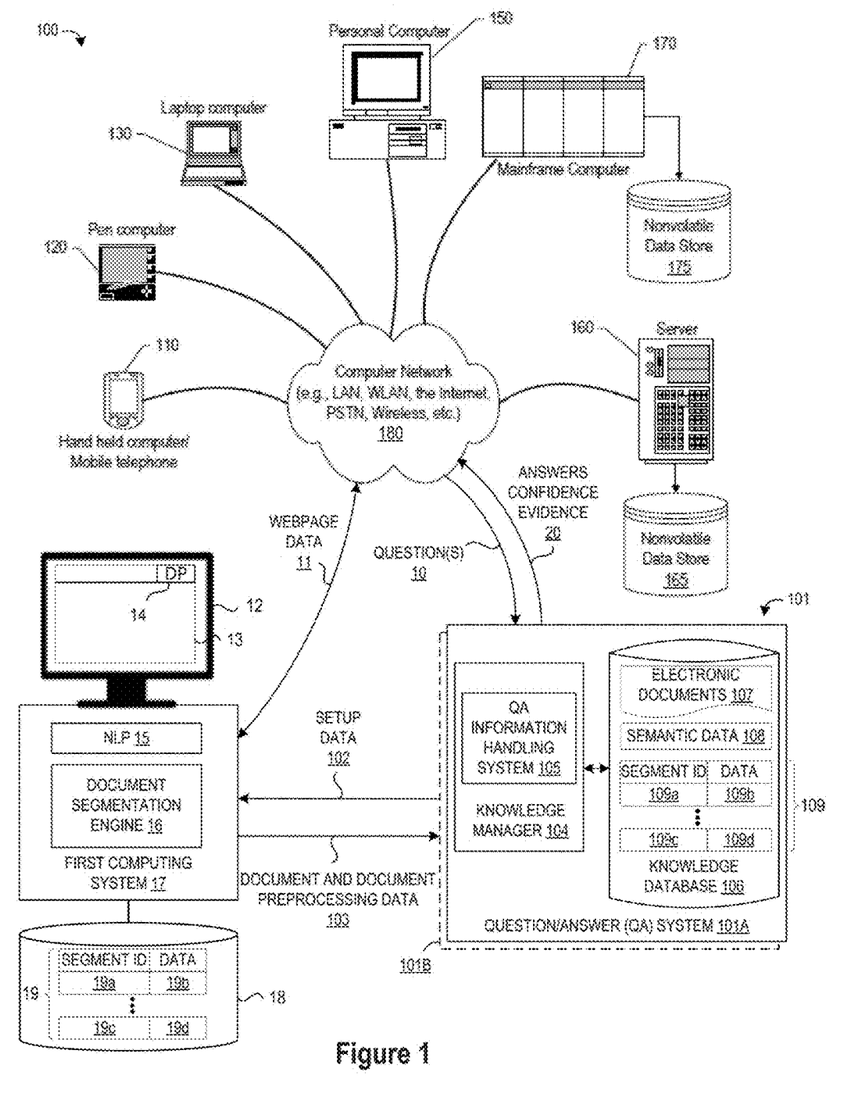
FIG. 1 depicts a system diagram that includes a QA system connected in a network environment to a computing system that uses a browser-based document segmentation tool to collect document preprocessing data.

FIG. 1 depicts a schematic diagram 100 of one illustrative embodiment of a question/answer (QA) system 101 directly or indirectly connected to a first computing system 17 that uses a document segmentation tool 16 to identify and collect document segment data 19 (e.g., text and/or image data from a document that is grouped into logical blocks or segments) for document preprocessing prior to being added to the corpus of a QA system 101. The QA system 101 may include one or more QA system pipelines 101A, 101B, each of which includes a knowledge manager computing device 104 (comprising one or more processors and one or more memories, and potentially any other computing device elements generally known in the art including buses, storage devices, communication interfaces, and the like) for processing questions received over the network 180 from one or more users at computing devices (e.g., 110, 120, 130). Over the network 180 the computing devices communicate with each other and with other devices or components via one or more wired and/or wireless data communication links, where each communication link may comprise one or more of wires, routers, switches, transmitters, receivers, or the like. In this networked arrangement, the QA system 101 and network 180 may enable question/answer (QA) generation functionality for one or more content users. Other embodiments of QA system 101 may be used with components, systems, subsystems, and/or devices other than those that are depicted herein.

In the QA system 101, the knowledge manager 104 may be configured to receive inputs from various sources. For example, knowledge manager 104 may receive input from the network 180, one or more knowledge bases or corpora 106 of electronic documents 107, semantic data 108, or other data, content users, and other possible sources of input.

In selected embodiments, the knowledge base 106 may include structured, semi-structured, and/or unstructured content in a plurality of documents that are contained in one or more large knowledge databases or corpora. The various computing devices (e.g., 110, 120, 130) on the network 180 may include access points for content creators and content users. Some of the computing devices may include devices for a database storing the corpus of data as the body of information used by the knowledge manager 104 to generate answers to cases. The network 180 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in an electronic document 107 for use as part of a corpora 106 of data with knowledge manager 104. The corpora 106 may include any structured and unstructured documents, including but not limited to any file, text, article, or source of data (e.g., scholarly articles, dictionary definitions, encyclopedia references, and the like) for use in knowledge manager 104. Content users may access knowledge manager 104 via a network connection or an Internet connection to the network 180, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 101 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 101 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 101 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 101 is connected to at least a first computing system 17 having a connected display 12 and memory or database storage 18 for identifying and collecting document segment data 19, which may take the form of one or more logical blocks or segment identifiers 19a, 19c with associated data 19b, 19d, such as text passages and/or image information, which may be added to the corpus of the QA system 101. Though shown as being directly connected to the QA system 101, the first computing system 17 may be indirectly connected 11 to the QA system 101 via the computer network 180. Alternatively, the functionality described herein with reference to the first computing system 17 may be embodied in or integrated with the QA system 101. To improve the answer quality of QA system 101, the first computing system 17 may be configured to collect and store document segment data 19 (e.g., segment identifiers for 19a, 19c with associated text and/or image data from the document 19b, 19d) in the memory/database storage 18. To efficiently collect the document segment data 19, the first computing system 17 may be configured to access one or more websites using search engine functionality or other network navigation tool to access one or more remote websites over the network 180 in order to locate information (e.g., an answer to a question). In selected embodiments, the search engine functionality or other network navigation tool exchanges webpage data 11 using any desired Internet transfer protocols for accessing and retrieving webpage data, such as HTTP or the like. By embedding functionality of the document segmentation tool 16 in the browser plugin, a document or page retrieved from an accessed website may be processed as a user views the document/page to see an initial set of composition segments that are automatically generated by the ingestion algorithm. In addition, the user can use the browser plugin to modify any of the initial composition segments on the fly, thereby generating more accurate document preprocessing data for collection and addition to a specified corpus.

To collect the document segmentation data 19, the document segmentation tool 16 may be configured to include an embedded document preprocessing (DP) segment visualization overlay 14 that is included with any displayed webpage 13. For example, the user can manipulate a cursor or otherwise select the DP overlay button 14 on the displayed page 13 to activate a segment generation functionality which uses an automated document segmentation algorithm to identify one or more initial composition segments from the text in the displayed page. In selected embodiments, the document segmentation collector 16 may be implemented with a browser plugin in which the DP overlay button 14 is embedded in the browser toolbar. In such embodiments, the DP overlay button 14 in the browser toolbar may also be activated to provide a set of segment manipulation tools for creating, resizing, or deleting the initial composition segment(s) to allow one or more users to provide feedback specifying how documents should be segmented and to modify or delete the initial composition segments to reflect the insight of the human observer. The resulting modified composition segment information (e.g., 19a) and associated data (e.g., 19b) may be assembled and stored as document segmentation data 19 in the memory/database storage 18 and/or automatically sent as document and preprocessing data 103 for storage in the knowledge database 106 as stored document and preprocessing data 109 where a domain expert or system knowledge expert can review and evaluate proposed submissions for inclusion in one or more corpora.

Types of information handling systems that can utilize QA system 101 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 180. Types of computer network 180 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
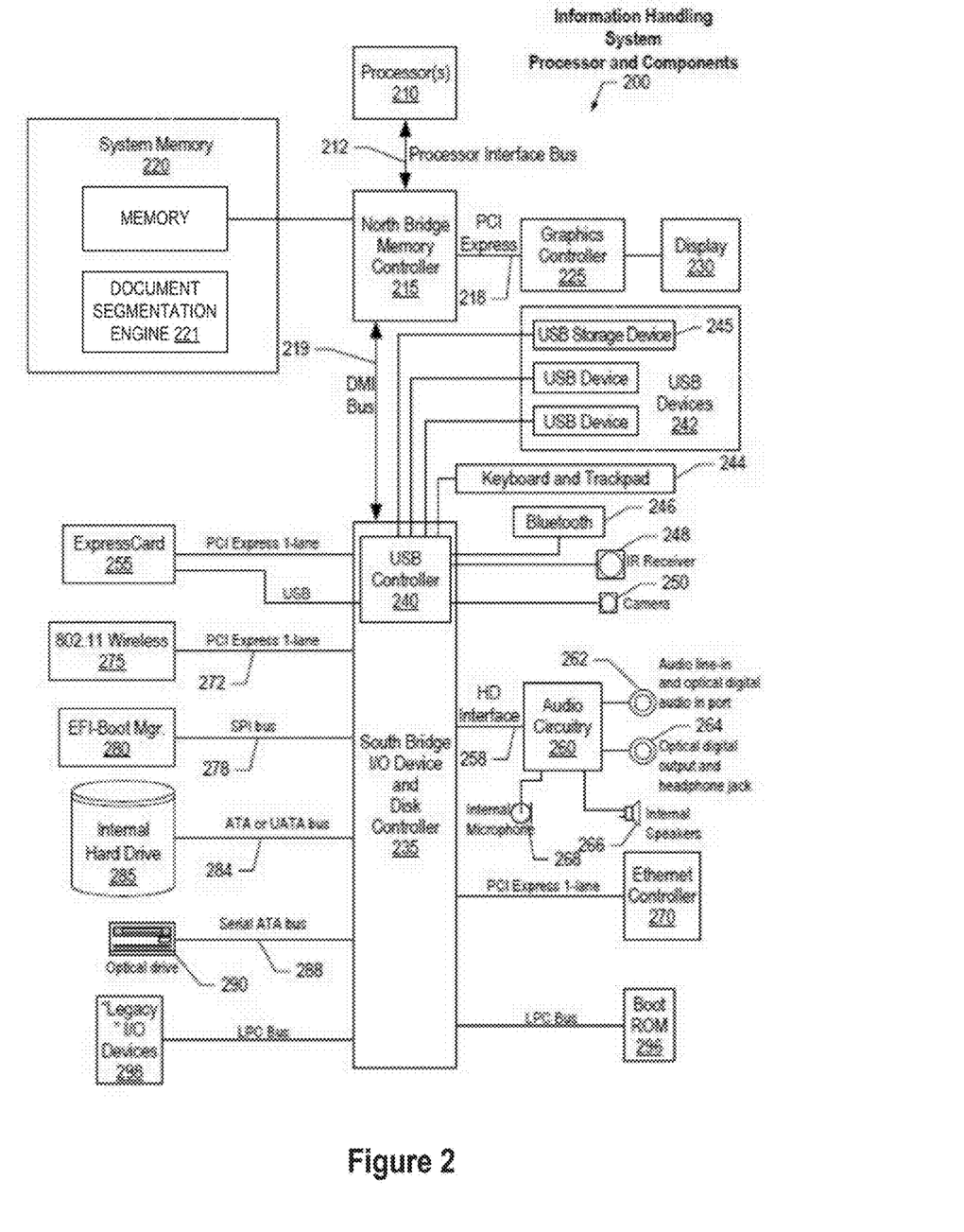
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a document segmentation tool module 221 which may be invoked to seamlessly generate document segmentations data by providing a user-activated browser plugin to display and manipulate document segments that are algorithmically generated from webpage documents by providing segment manipulation tools in the browser toolbar for creating, resizing, or deleting the algorithmically generated document segments to allow one or more users to provide feedback specifying how documents should be segmented and to modify or delete the initial composition segments to reflect the insight of the human observer. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" 110 devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
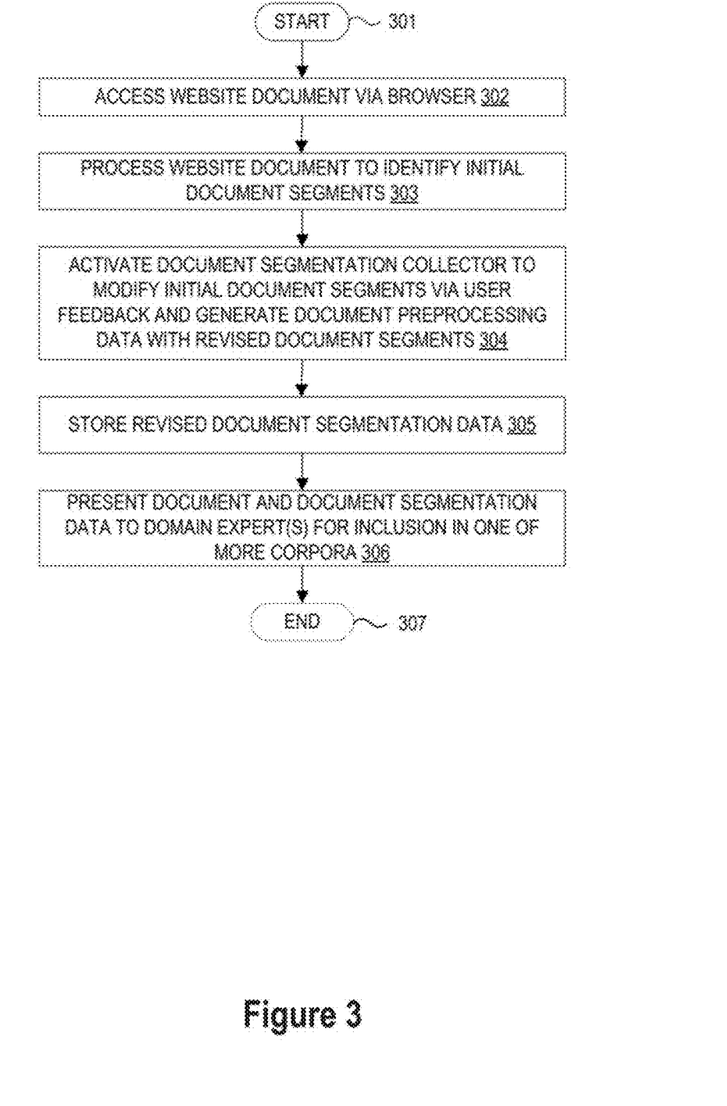
FIG. 3 illustrates a simplified flow chart showing the logic for collecting document segmentation data for submission to one or more corpora used by a QA system.

FIG. 3 depicts an approach that can be executed on an information handling system to identify and collect document segmentation data for use in document preprocessing and corpus management in a QA system, such as QA system 101 shown in FIG. 1, to answer questions. This approach can be implemented at the computing system 17 or the QA system 101 shown in FIG. 1, or may be implemented as a separate computing system, method, or module. Wherever implemented, the disclosed document segmentation collection scheme efficiently generates document segmentation data using a browser-based plugin viewing tool to incorporate user feedback and correction into a process of segmenting documents/pages that are added to a corpus in a QA system. The collection processing may include providing a document preprocessing toolbar button on the browser-based plugin viewing tool. Upon activation of the document preprocessing toolbar button (e.g., by clicking the button), the disclosed browser plugin tool automatically generates one or more initial composition segments for grouping document text and/or image information using an automated segmentation algorithm. In addition, the disclosed browser-based plugin viewing tool may also provide segment manipulation tools for creating, resizing, or deleting the initial composition segment(s). With the disclosed document segmentation collection scheme, an information handling system can be configured to allow one or more users to provide feedback specifying how documents should be segmented and to modify or delete the initial composition segments to reflect the insight of the human observer, thereby improving the overall accuracy of the data sent for evaluation by the domain expert or system knowledge expert.

To provide additional details for an improved understanding of selected embodiments of the present disclosure, reference is now made to FIG. 3 which depicts a simplified flow chart 300 showing the logic for collecting document segmentation data for submission to one or more corpora used by a QA system. The processing shown in FIG. 3 may be performed by a cognitive system, such as the first computing system 17, QA system 101, or other natural language question answering system.

FIG. 3 processing commences at 301 whereupon, at step 302, a user accesses a website, such as an Internet website or a forum type web site (e.g., Stack Overflow). Using any desired user interface tools (e.g., display, cursor, keyboard, etc.), the user may navigate to the website, such as by using a search engine to display search results, one of which is selected to access the website document. In selected embodiments where the user is looking for answers to a question as part of a ground truth collection process, the user may enter the question into the browser's search engine to generate search results. As described herein, the website access step 302 may be performed before or after activation of the document segmentation collector tool. For example, a user at a computing device may launch a browser or other search engine to locate information on a website independently of any ground truth collection/corpus curation effort or as part of a ground truth collection/corpus curation effort (e.g., upon determining that a ground truth store does not include an answer for a question). The processing at step 302 may be performed at the first computing system 17, the QA system 101 or other NLP question answering system.

At step 303, one or more documents from the accessed website are processed for possible ingestion into one or more corpora of a QA system by identifying one or more initial document segments so that the website document(s) can be searched and referenced more accurately. To implement step 303, a back end system may scrape the HTML page and run the results through a preprocessing framework so the algorithmic-based document segments can be generated and presented to the user as an overlay on the page. The processing at step 303 may be performed at the first computing system 17, the QA system 101 or other NLP question answering system. In selected embodiments, the initial document segments are identified using a purely automated approach to algorithmically identify initial document segments. An example segmentation algorithm would look for headings that should be grouped in a segment with text by identifying heading text (e.g., having larger and/or bold-faced font, etc.) that is grouped with a subsection of text under that heading text.

Figure 4A:
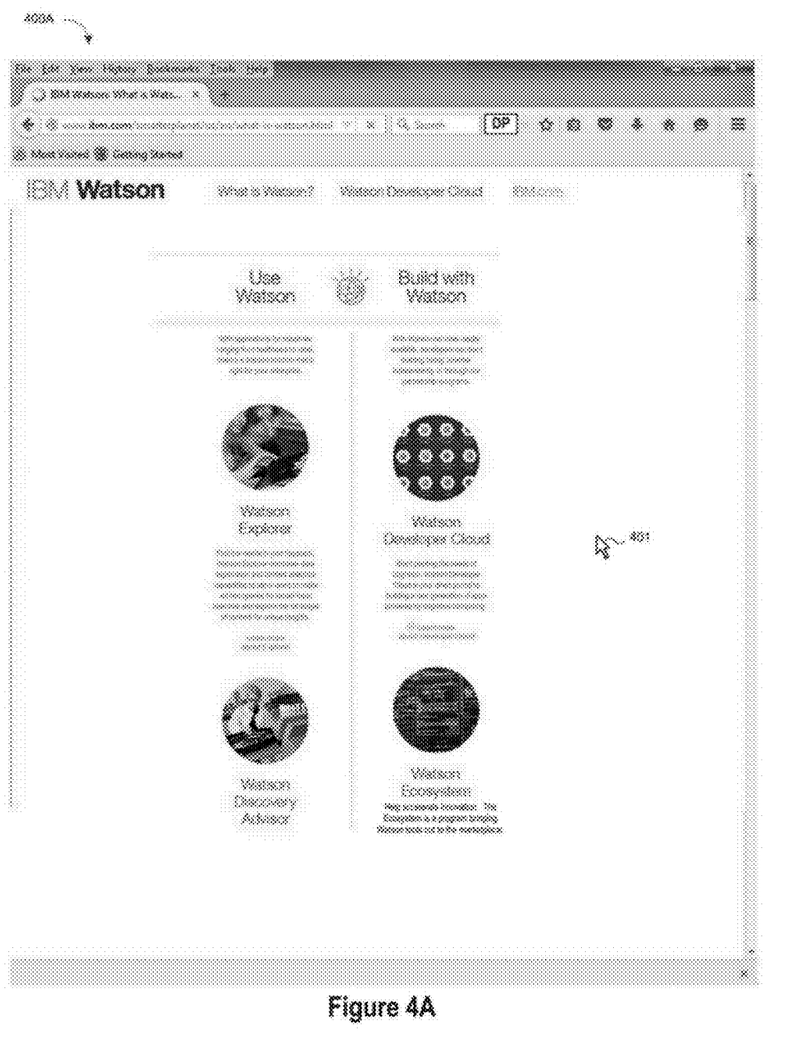
FIGS. 4A-F illustrate a sequence of example screen shots used in connection with collecting document segmentation data using a browser-based segmentation tool.

While the algorithmic approach for generating document segments works reasonably well with well-formatted documents, it will have lower accuracy when dealing with documents having complex formatting. An example of a document having complex formatting is shown in FIG. 4A which depicts a first example screen shot 400A used in connection with a browser-based document collection sequence. As indicated with the first screen shot 400A, a user has accessed an HTML website page (www.ibm.com/smarterplanet/us/en/what-is-watson.html) that may look straightforward to the human eye, but could be difficult for an automated system to understand. For example, the "Use Watson" heading would be understood by a human observer to be associated with the left column of data such that the text "With applications for industries . . . " being a general description associated with the "Use Watson" heading. In addition, the "Watson Explorer" and "Watson Discovery Advisor" headings would be understood by a human observer to be "Watson" products that can be "used" by virtue of the placement under the "Use Watson" heading. Similarly, the "Build Watson" heading in the right column would be understood by a human observer to be associated with the general description text "With Watson services readily available . . . " and the additional "Watson Developer Cloud" and "Watson Ecosystem" headings and associated product text on the right column. However, with the layout structure of the HTML, page 400A, it would be quite difficult for an automated segmentation tool to associate the heading with the column of information, or differentiate between the general text vs product text.

The difficulty with auto-generating document segments is illustrated with reference to FIG. 4B which depicts a second example screen shot 400B of the HTML page shown in FIG. 4A, but with initial document segments 410-417 that are generated and displayed with an automated, algorithmic document segment generator. In selected embodiments, the initial document segments 410-417 may be automatically generated from the webpage document when the user manipulates a cursor 401 to click or otherwise selects the document preprocessing (DP) button 402 on the displayed page 400B to activate a document collection application in which an automated document segmentation algorithm is used to identify and display one or more initial composition segments from the text in the displayed webpage document. In the illustrated example, the initial document segments include a first document segment 410 identifying the "Use Watson" heading, and a second document segment 411 separately identifying the general description "With applications for industries . . . " text, but without associating the heading and general description text. In addition, the automated document segmentation algorithm also generates a third document segment 412 that correctly reflects the relationship between the image 412a, title 412b, text 412c, and link 412d, and a fourth document segment 413 that correctly reflects the relationship between the image 413a and title 413b, but without depicting the relationship between the "Watson Explorer" 412b and "Watson Discovery Advisor" heading 413b. In similar fashion, the fifth document segment 414, sixth document segment 415, seventh document segment 416, eighth document segment 417 are automatically generated from the information in the right-hand column, but without identifying relations between the different headings and text. As will be appreciated, the initial document segments 410-417 could be further segmented, depending on the algorithm, and a custom algorithm could be written to understand this specific type of web page architecture.

Once the initial document segments 410-417 are generated at step 303, the user may provide feedback to adjust and modify the displayed document segments 410-417 at step 304 by activating a document segmentation collector tool to provide a set of document segment tools that allows a user to select documents and their sections visually/manually to incorporate how documents should be segmented and uploaded in the QA system. Using the document segment tools, the user, who is adding the document to the corpus and who understands its content, can provide invaluable insight into how the document should be segmented. Additional insights may be provided by other users who are able to view the document while in the ingestion queue and provide their input on how the document should be segmented. Or if a user with the browser plugin enabled visited a page that we have in the queue, they could be prompted for their input as well.

Figure 4B:
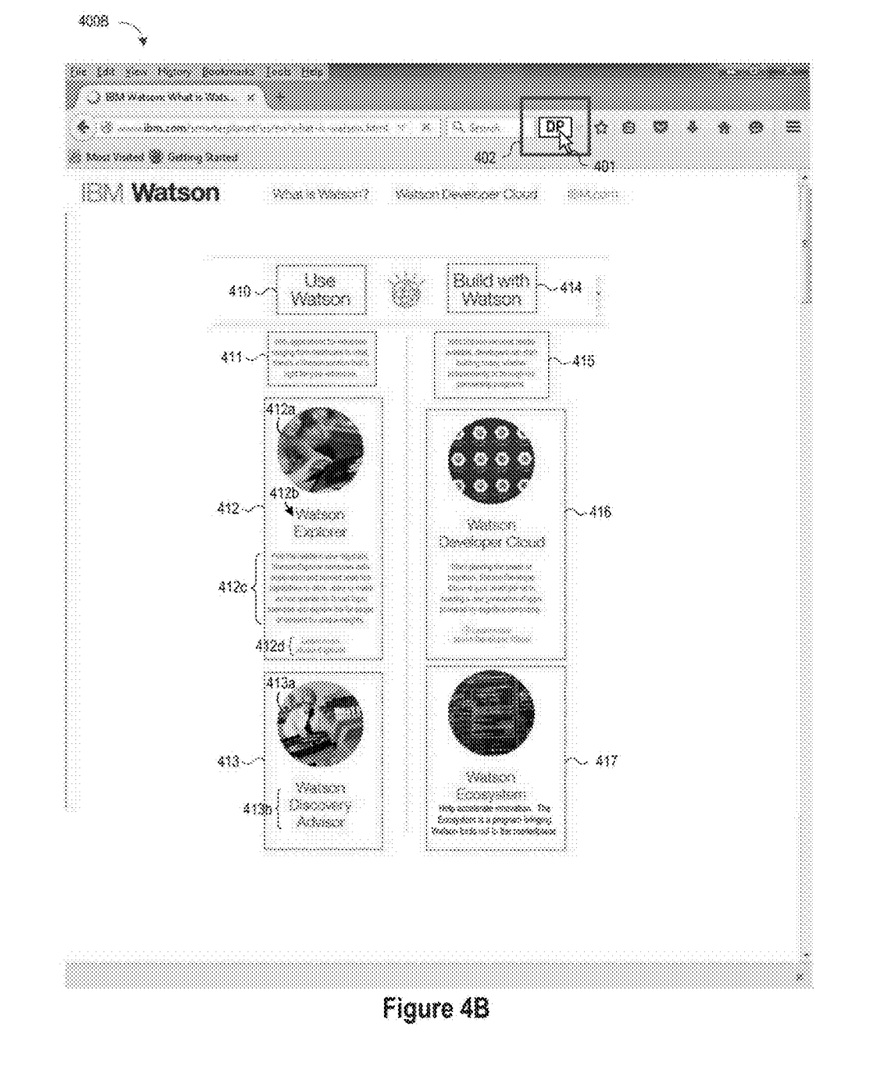
Figure 4C:
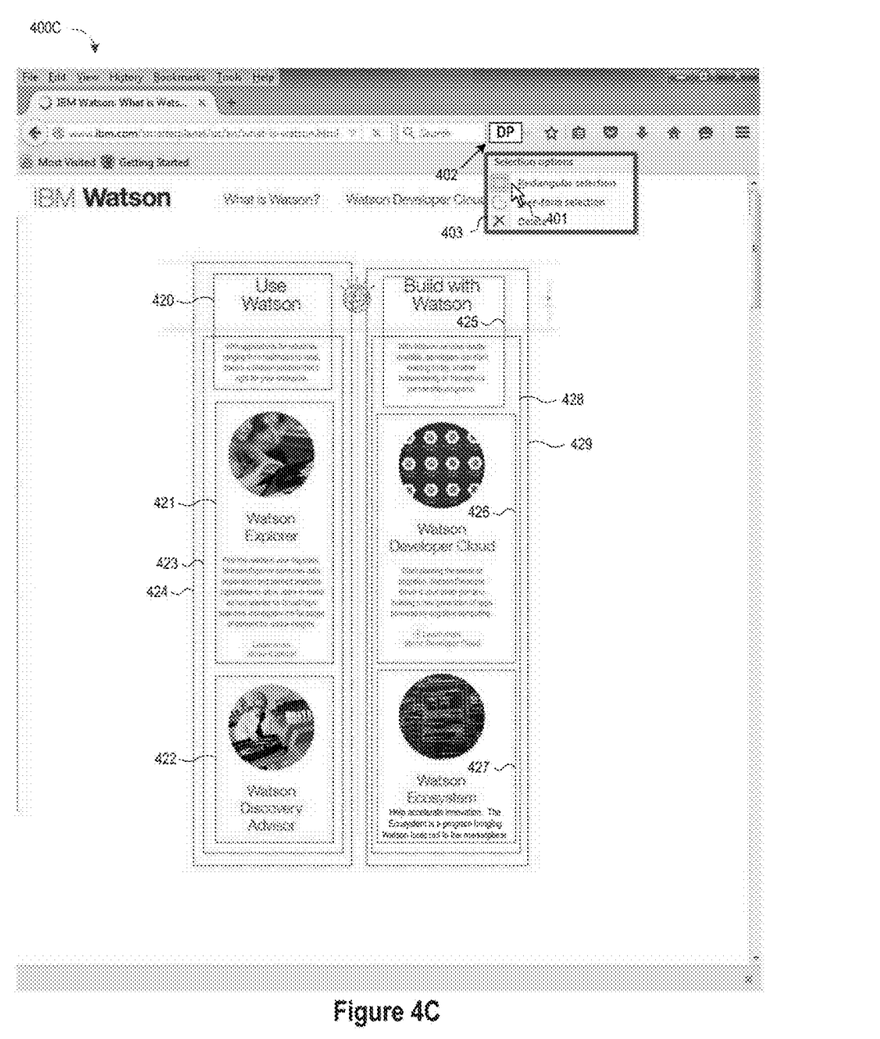

To illustrate selected embodiments of the document segment tools which may be used to create or modify document segments, reference is now made to FIG. 4C which depicts a third example screen shot 400C in which the initial document segments 410-417 from FIG. 4B have been modified to create document segments 420-429. To enable document segment modification, the user can manipulate a cursor right-click) or otherwise select the DP overlay button 402 on the displayed page 400C to activate a set of document segment control tools 403 in the browser to manually create, move, modify, or delete any selected initial document segment as needed. In addition or in the alternative, the user can manipulate the cursor 401 to interact with a selected document segment to move, resize, or otherwise modify the selected initial document segment, thereby modifying the position, shape, and/or size of the document segment to as needed.

In the example depicted in FIG. 4C, the document segment control tools enable user feedback to create new or modified document segments (e.g., document segment 420) which combine one or more elements (e.g., the "Use Watson" heading element and related general description "With applications for industries . . . " text element) which were not recognized as being related by the automated, algorithmic document segment generator. For example, the first document segment 420 may be generated by selecting the "Rectangular selection" option from the document segment control tools 403 and then creating a new rectangular document segment 420. In similar fashion, the "Rectangular selection" option could be used to create a new document segment 423 which combines the left-column document elements 421 (corresponding to document segment 412 in FIG. 4B) and 422 (corresponding to document segment 413 in FIG. 4B). Likewise, the "Rectangular selection" option could be used to create a new document segment 424 which combines the left-column document elements 420-423 for the elements in the left column. In similar fashion, the right-column document elements 425-429 may be created with the document segment control tools.

Figure 4D:
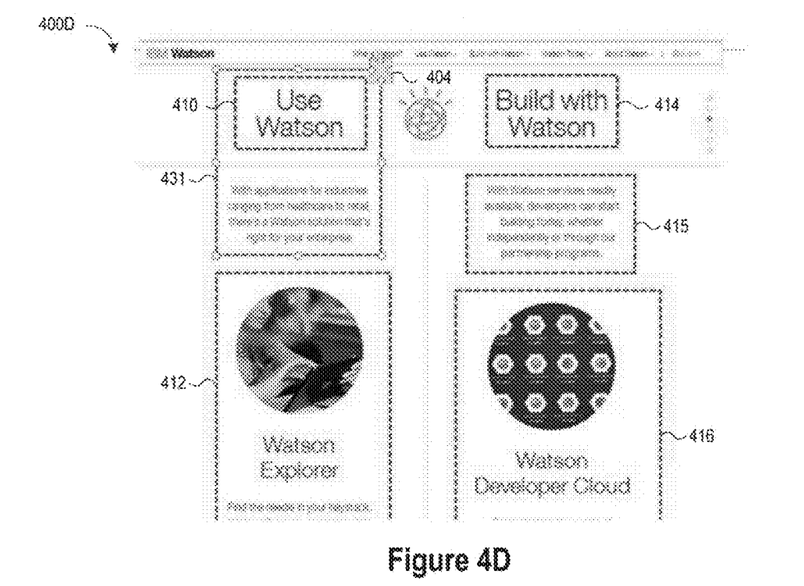

In addition or in the alternative to creating new document segments, a document segment could be generated by moving the cursor 401 over an initial document segment (e.g., 411 shown in FIG. 4B) to click and drag a segment, effectively extending or resizing the initial document segment to include one or more additional document elements. This resizing function is illustrated with the example embodiment shown in FIG. 4D which depicts a fourth example screen shot 400D in which the initial document segment 411 from FIG. 4B is modified to create document segment 431 by positioning the cursor 404 to interact with the document segment 431 to reposition the segment to surround and include the first document segment 410 for the "Use Watson" heading element and the related general description "With applications for industries . . . " text element.

Figure 4E:
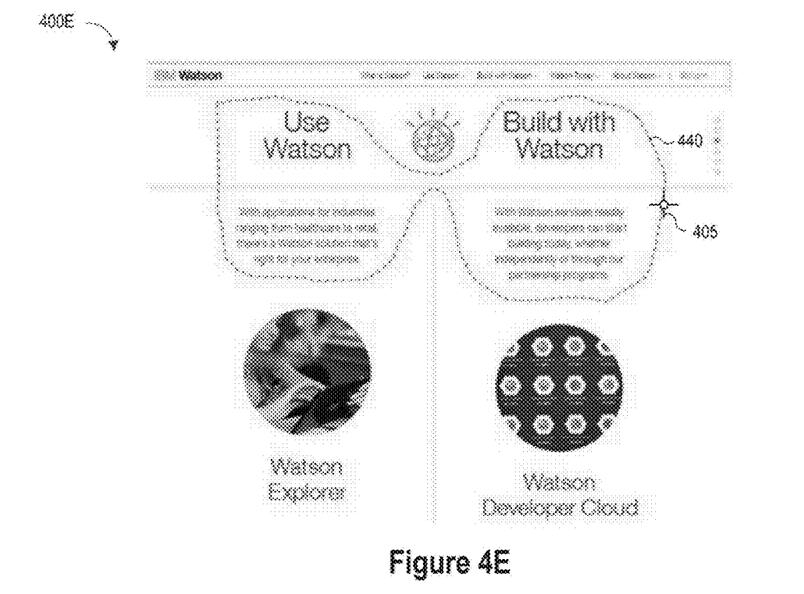

In another example embodiment, the document segments can be added by drawing freehand boxes around elements on the page. This drawing function is illustrated with the example embodiment shown in FIG. 4E which depicts a fifth example screen shot 400E in which a document segment 440 is created by manipulating the cursor 405 to surround and include elements on the page that are not easy to relate to each other by looking at the markup of the page. For example, the document segment 440 may be generated by selecting the "Free-form selection" option from the document segment control tools 403 (shown in FIG. 4C) and then creating a new free-form document segment 440.

Figure 4F:
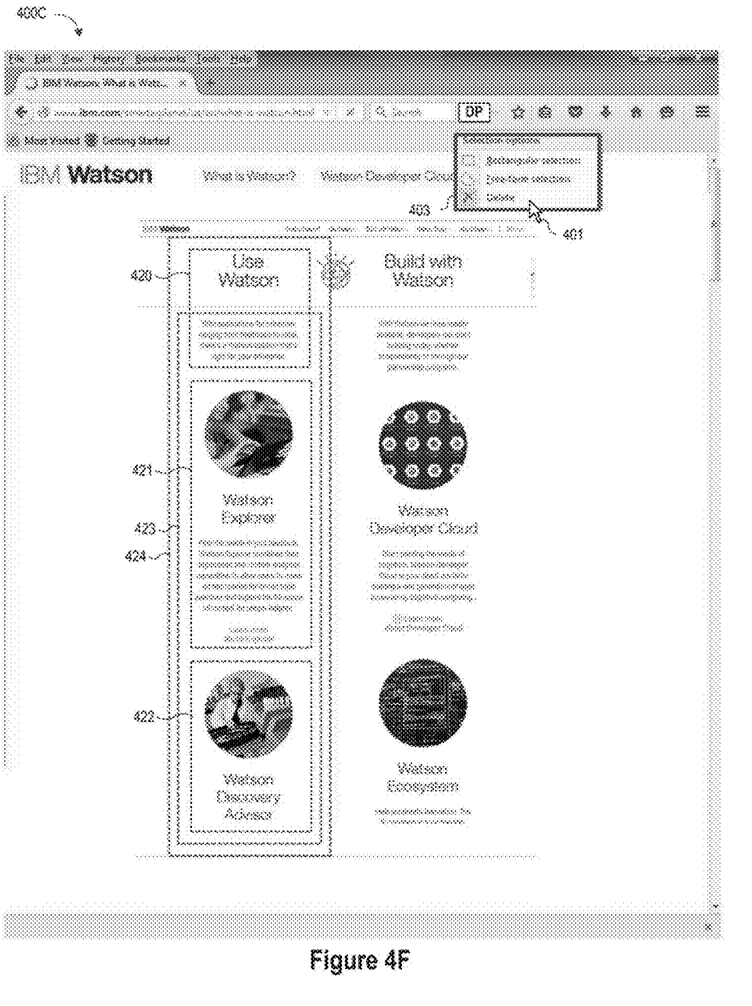

In addition or in the alternative, one or more document segments could be deleted from a displayed website document. In an example scenario where the user is building a corpus about Watson products, but does not want information about Watson development frameworks/tools, the deletion function could be activated by using the cursor 401 to select the "Delete" option from the document segment control tools 403 and then select one or more document segments (e.g., 425-429 from FIG. 4C) to be deleted, leaving in place the document segments 420-424. The resulting page overlay is shown in FIG. 4F which depicts a sixth example screen shot 400F after deletion of the document segments 425-429 so that they are not be included in the corpus.

As disclosed herein, the processing at step 304 to generate the screen shots shown in FIGS. 4C-F may be performed at the first computing system 17, the QA system 101 or other computing system on which a browser-based document segmentation tool is run. The document segment modification processing at 304 enables the user to see what document segments are generated by the automated document segmentation algorithm, and then make modifications thereto by including a set of tools in the browser plugin for user modifications to the document segments. With this approach, the document segment control took allow a user to create segments that span or overlap multiple elements on a page (i.e., draw a segment around two headers that are side by side in a website document, or around a Header, paragraph and image, etc.). In addition, the disclosed document segment control tools allow for the nesting of document segments within one another (e.g., segments 426 and 427 are nested within 428).

At step 305, the revised document segments are stored. For example, a first computing system (e.g., computing system 17) may store the collected document segment data 19 in the memory/database storage 18. When ready, the user can send the assembled document preprocessing data 19 via a direct connection 103 and/or network (e.g., a network 180 including, but not limited to Intranet, Internet, Wireless communication network, Wired communication network, Satellite communication network, etc.) to a second computing system for storage in the document and preprocessing data 109. For example, the second computing system may be embodied, but is not limited to, an artificial intelligent computer, Watson™ computer (trademark of International Business Machine, Inc. Armonk, N.Y.), etc. In selected embodiments, the first computing system and the second computing system are two different computing systems. In other embodiments, the first computing system and the second computing system are a single computing system. An artificial intelligent computer refers to an intelligent computing system adapted to perform a question answering (QA), natural language processing, data retrieval, logical reasoning, machine learning, etc.

At step 306, a domain expert or system knowledge expert can review and evaluate proposed document/document segmentation data for inclusion in one or more corpora. With the submitted document and preprocessing data, the one or more targeted corpora can be updated with a document or document link generated with the collected document and preprocessing data.

After using the document collection process 300 to identify, collect, and evaluate document segmentation data, the process ends at step 307 until such time as the user reactivates the document collection process 300 with another session. Alternatively, the document collection process 300 may be reactivated by the QA system to allow other users to view documents that are in the ingestion queue and provide their input on how they should be segmented. For example, if a user with the browser plugin enabled visits a website page that is pending in the queue, the QA system could prompt the user for their input, including provided modified document segment information. In this way, a website document that has been segmented and ingested could be viewed at any time by any user of the system who could then alter the segmentation details. In this scenario, if a document becomes relevant that includes passages that were excluded or left out by the first user, a second user could return to the document, view the overlay, and add new document segment information. In such embodiments, the domain expert or subject matter expert could verify any updates to the document segments before the ingested content is changed.

As the human users provide segmentation details through the methods describe herein, the browser-based plugin viewing tool provides a real-time preview of the raw text segments as they would be fed into the ingestion engine, and enables the user to have a cleaner view of the segments (without the layout and images) which will help better validate the segments and/or make any required modifications. Additionally, the raw text segments preview allows easier comparison with the segmentation of other SMEs which would help for adjudication. Though described with reference to an example browser-based plugin viewing tool, it will be appreciated that selected embodiments of the present disclosure may be embodied with other document viewers, including but not limited to Acrobat Reader, Word, PowerPoint, and the like.

By now, it will be appreciated that there is disclosed herein a system, method, apparatus, and computer program product for collecting document segmentation data at a first information handling system having a processor and a memory. As disclosed, the system, method, apparatus, and computer program product may use a browser search engine to display search results in a browser display window, one of which may be selected to display a webpage document that is retrieved from a first website by a user. In connection with the webpage document displayed in the browser display window, a document segmentation browser plugin may be activated (e.g., by manipulating a display cursor to click on a document preprocessing toolbar button on the browser display window) to generate one or more initial document segments, each associating one or more text block elements and/or visual block elements in the webpage document. In selected embodiments, upon activation of the document segmentation browser plugin, a back end system scrapes the webpage document to extract HTML page data, and then the HTML page data is applied to an automated document segment generator to generate algorithmic-based initial document segments for display as an overlay on the webpage document. A first initial document segment may be modified based on user feedback through a document segment control tool to generate a modified set of one or more initial document segments. In selected embodiments, the first initial document segment is modified by expanding a size of the first initial document segment to include one or more additional text block elements and/or additional visual block elements in the webpage document based on user feedback using a resize document segment control tool. In other embodiments, the first initial document segment is modified by reducing a size of the first initial document segment based on user feedback using a resize document segment control tool. This function can be used to remove one or more of the text block elements and/or visual block elements from the first initial document segment. In other embodiments, the first initial document segment is modified by deleting the first initial document segment based on user feedback using a delete document segment control tool. In other embodiments, a new document segment is created based on user feedback using a new document segment control tool, where the new document segment is included in the modified set of one or more initial document segments. Upon completion of data entry, the modified set of one or more initial document segments may be stored as document and preprocessing data from the webpage document, and may also be transmitted to a second information handling system for evaluation by a subject matter expert.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of collecting document segmentation data, the method comprising:
   displaying, by a first information handling system comprising a processor and a memory, a webpage document in a browser display window, where the webpage document is retrieved from a first website by a user;
   activating, at the first information handling system, a document segmentation browser plugin to generate one or more initial visual overlay document segments for display over the webpage document shown in the browser display window, each associating one or more text block elements and/or visual block elements in the webpage document;
   modifying, by the first information handling system, at least a first initial visual overlay document segment based on user feedback through a document segment control tool to generate a modified set of one or more visual overlay document segments for display over the webpage document shown in the browser display window, each defining a logical content block for analysis by a natural language processing system; and
   storing, by the first information handling system, the modified set of one or more visual overlay document segments as document and document preprocessing data from the webpage document for ingestion in one or more corpora by the natural language processing system.

2. The method of claim 1, where activating the document segmentation collection browser plugin comprises manipulating a display cursor at the first information handling system to click on a document preprocessing toolbar button on the browser display window.

3. The method of claim 1, where activating the document segmentation collection browser plugin comprises:
   scraping the webpage document with a back end system to extract HTML page data; and
   applying the HTML page data to an automated document segment generator which generates algorithmic-based initial visual overlay document segments for display as an overlay on the webpage document.

4. The method of claim 1, where modifying the first initial visual overlay document segment comprises modifying the first initial visual overlay document segment to generate a first modified visual overlay document segment as an overlay on the displayed webpage document that is ready to be ingested and analyzed by the first information handling system.

5. The method of claim 1, where modifying the first initial visual overlay document segment comprises reducing a size of the first initial visual overlay document segment based on user feedback using a resize document segment control tool.

6. The method of claim 1, where modifying the first initial visual overlay document segment comprises deleting the first initial visual overlay document segment based on user feedback using a delete document segment control tool.

7. The method of claim 1, further comprising creating a new visual overlay document segment for display over the webpage document shown in the browser display window based on user feedback using a new document segment control tool, where the new visual overlay document segment is included in the modified set of one or more visual overlay document segments.

8. The method of claim 1, further comprising transmitting, by the first information handling system, the document and document preprocessing data to a second information handling system for evaluation by a subject matter expert.

9. An information handling system comprising:
   one or more processors;
   a memory coupled to at least one of the processors;
   a set of instructions stored in the memory and executed by at least one of the processors to collect document segmentation data, wherein the set of instructions are executable to perform actions of:
   displaying, by a first information handling system comprising a processor and a memory, a webpage document in a browser display window, where the webpage document is retrieved from a first website by a user;
   activating, at the first information handling system, a document segmentation browser plugin to generate one or more initial visual overlay document segments for display over the webpage document shown in the browser display window, each associating one or more text block elements and/or visual block elements in the webpage document;
   modifying, by the first information handling system, at least a first initial visual overlay document segment based on user feedback through a document segment control tool to generate a modified set of one or more visual overlay document segments for display over the webpage document shown in the browser display window, each defining a logical content block for analysis by a natural language processing system; and storing, by the first information handling system, the modified set of one or more visual overlay document segments as document and document preprocessing data from the webpage document for ingestion in one or more corpora by the natural language processing system.

10. The information handling system of claim 9, wherein the set of instructions are executable to activate the document segmentation collection browser plugin by manipulating a display cursor at the first information handling system to click on a document preprocessing toolbar button on the browser display window.

11. The information handling system of claim 9, wherein the set of instructions are executable to activate the document segmentation collection browser plugin by:

scraping the webpage document with a back end system to extract HTML page data; and applying the HTML page data to an automated document segment generator which generates algorithmic-based initial visual overlay document segments for display as an overlay on the webpage document.

12. The information handling system of claim 9, wherein the set of instructions are executable to modify the first initial visual overlay document segment by modifying the first initial visual overlay document segment to generate a first modified visual overlay document segment as an overlay on the displayed webpage document that is ready to be ingested and analyzed by the first information handling system.

13. The information handling system of claim 9, wherein the set of instructions are executable to modify the first initial visual overlay document segment by deleting the first initial visual overlay document segment or reducing a size of the first initial visual overlay document segment based on user feedback.

14. The information handling system of claim 9, wherein the set of instructions are executable to create a new visual overlay document segment for display over the webpage document shown in the browser display window based on user feedback using a new document segment control tool, where the new visual overlay document segment is included in the modified set of one or more visual overlay document segments.

15. The information handling system of claim 9, wherein the set of instructions are executable to transmit, by the first information handling system, the document and document preprocessing data to a second information handling system for evaluation by a subject matter expert.

16. A computer program product stored in a computer readable storage medium, comprising computer instructions that, when executed by an information handling system, causes the system to collect document segmentation data by performing actions comprising:

displaying, by a first information handling system comprising a processor and a memory, a webpage document in a browser display window, where the webpage document is retrieved from a first website by a user;

activating, at the first information handling system, a document segmentation browser plugin to generate one or more initial visual overlay document segments for display over the webpage document shown in the browser display window, each associating one or more text block elements and/or visual block elements in the webpage document;

modifying, by the first information handling system, at least a first initial visual overlay document segment based on user feedback through a document segment control tool to generate a modified set of one or more visual overlay document segments for display over the webpage document shown in the browser display window, each defining a logical content block for analysis by a natural language processing system; and storing, by the first information handling system, the modified set of one or more visual overlay document segments as document and document preprocessing data from the webpage document for ingestion in one or more corpora by the natural language processing system.

17. The computer program product of claim 16, wherein activating the document segmentation collection browser plugin comprises:

scraping the webpage document with a back end system to extract HTML page data; and applying the HTML page data to an automated document segment generator which generates algorithmic-based initial visual overlay document segments for display as an overlay on the webpage document.

18. The computer program product of claim 16, wherein modifying the first initial visual overlay document segment comprises modifying the first initial visual overlay document segment to generate a first modified visual overlay document segment as an overlay on the displayed webpage document that is ready to be ingested and analyzed by the first information handling system.

19. The computer program product of claim 16, wherein modifying the first initial visual overlay document segment comprises reducing a size of the first initial visual overlay document segment based on user feedback using a resize document segment control tool or deleting the first initial visual overlay document segment based on user feedback using a delete document segment control tool.

20. The computer program product of claim 16, wherein the computer instructions, when executed by the information handling system, cause the system to create a new visual overlay document segment for display over the webpage document shown in the browser display window based on user feedback using a new document segment control tool, where the new visual overlay document segment is included in the modified set of one or more initial document segments.

* * * * *